United States Patent [19]

Lauritano

[11] Patent Number: 5,607,247

[45] Date of Patent: Mar. 4, 1997

[54] TOOL FOR MANIPULATING MULTIPLE ROTATABLE BALANCED BODIES

[76] Inventor: Giuseppe Lauritano, 3555 Hoover St., Redwood City, Calif. 94063

[21] Appl. No.: 390,098

[22] Filed: Feb. 17, 1995

[51] Int. Cl.$^6$ ............................ B25G 3/00; F16B 9/00; F16D 1/00; E21B 19/16

[52] U.S. Cl. .................. 403/16; 403/11; 403/19; 403/260; 474/166; 474/903; 74/575; 74/841; 81/488

[58] Field of Search .................. 403/11, 16, 19, 403/22, 258, 260; 474/166, 197, 903; 74/3, 825, 813 C, 841, 575; 81/484, 486, 488

[56] References Cited

U.S. PATENT DOCUMENTS

| | | | |
|---|---|---|---|
| 3,023,035 | 2/1962 | Kelley | 403/16 |
| 4,066,048 | 1/1978 | Premus | 474/903 X |
| 4,253,350 | 3/1981 | De Tarr | 81/486 |
| 4,706,353 | 11/1987 | Zgliczynski | 29/240 |
| 4,929,111 | 5/1990 | Lauritano | 403/16 |
| 4,979,409 | 12/1990 | Garrett et al. | 81/486 |
| 5,018,414 | 5/1991 | Naumann | 81/484 |

*Primary Examiner*—Brian K. Green
*Assistant Examiner*—Bruce A. Lev
*Attorney, Agent, or Firm*—Bielen, Peterson & Lampe

[57] ABSTRACT

A device for steadying a first balanced rotatable member relative to a second balanced rotatable member. A steadying tool is applied to the first balanced rotatable member while another tool precision torques the second balanced rotatable member. An element having a surface placed against the first balanced rotatable member. The element includes a faceted aperture capable of locking interaction with the steadying tool. The element also includes an axis aperture to permit torquing of the second balance rotatable member with the torquing tool. The element is configured to not disrupt the balance of the first and second balance members. The element may be fixed to the first balanced rotatable member during use.

5 Claims, 2 Drawing Sheets

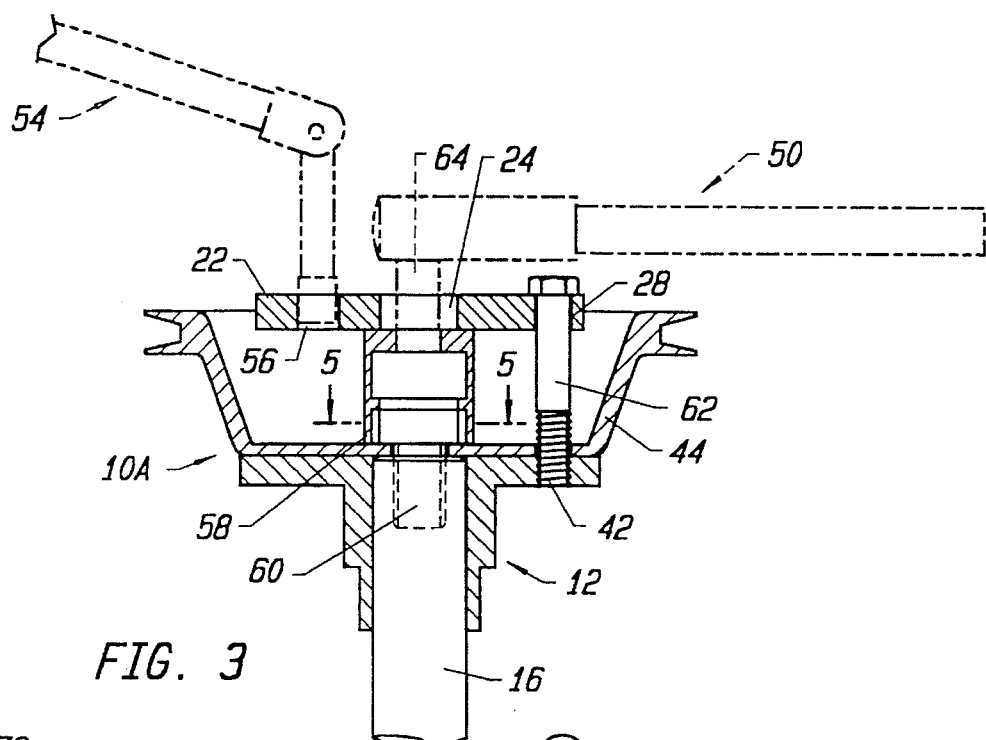
FIG. 3
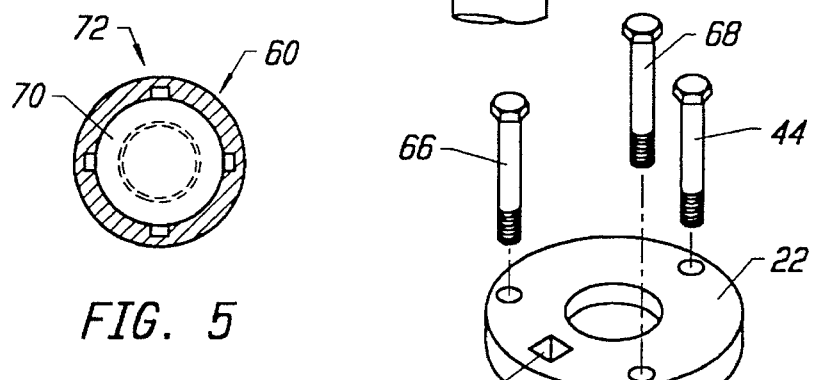
FIG. 5
FIG. 4
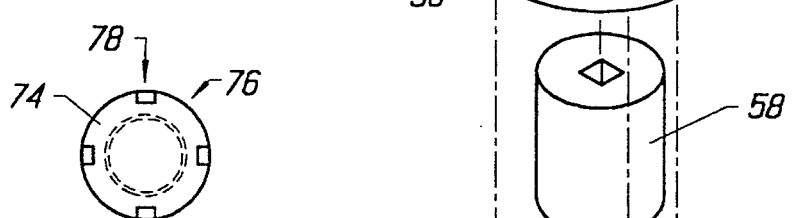
FIG. 6

5,607,247

TOOL FOR MANIPULATING MULTIPLE ROTATABLE BALANCED BODIES

BACKGROUND OF THE INVENTION

The present invention relates to a novel and useful device for steadying a first balanced rotatable member while a second balanced rotatable member may be precision torqued. Automotive and aviation engines often require manipulation of multiple balanced members for the purposes of repair, replacement, and installation of engine parts. In the past, multiple persons were employed to steady one of the balanced members, while another person would torque or move the second balanced body.

In an automotive internal combustion engine, the crank shaft is normally fitted with a harmonic balancer at one end thereof. It is often necessary to rotate or turn the harmonic balancer, or to torque the crank shaft bolt. Moreover, other items are connected to the crank shaft such as flywheels, which require the steadying of harmonic balancer.

Reference is made to U.S. Pat. No. 4,929,111 which represented a notable advance in the field in which a tool is connected to the harmonic balancer and includes an open bore which permits access to the center bolt which is capable of engaging the crank shaft. However, torquing of the crank shaft bolt while steadying harmonic balancer is more difficult to achieve with the tool of this patent.

A device for steadying one of two balanced axially rotatable members to permit precision torquing of the other would be a notable advance in the mechanical arts.

SUMMARY OF THE INVENTION

In accordance with the present invention a novel and useful device for steadying a first balanced rotatable member relative to the second balanced rotatable member which may be torqued is herein provided.

The device of the present invention utilizes an element having a surface which is capable of lying adjacent to the first balanced rotatable member. Intermediate items such as pulleys may interpose the element and the first balanced rotatable member. The element may be bolted or otherwise fastened to the first balanced rotatable member in any removable fashion. The element includes a faceted aperture which is capable of locking interaction with a steadying tool. The element also possesses an access aperture to permit torquing of the second balanced rotatable member with a torquing tool. The element itself is configured to lie in balance with the first and second balanced members when fastened adjacent the first balanced rotatable member. Means for fixing the element to the first balanced rotatable member may take the form of bolts, welding, gluing, and other suitable fastening means. In the case where bolts are employed, the element is easily taken apart from the first balanced rotatable member when not being used. In certain cases, a socket may be held in engagement with the second balanced member and be interposed the element and the second balanced body. The axis aperture of the element permits engagement of the socket by the torquing tool. Thus, the second balanced body may be precision torqued using the socket. It should be noted that the socket may be a faceted socket, a slotted configured socket, and the like.

It may be apparent that a novel and useful device for steadying and/or manipulating multiple balanced bodies has been described.

It is therefore an object of the present invention to provide a device for manipulating multiple balanced bodies connected to one another by permitting the use of steadying and torquing tools at the same time in order to either steady or to manipulate a particular balance body.

Another object of the present invention is to provide a device for manipulating multiple balanced bodies which may be easily attached to one of the balanced bodies and yet permit access to the second balanced bodies.

Another object of the present invention is to provide a device for manipulating co-axial balanced bodies which includes an element that is fastened to one of the balanced bodies along the axis of the same without upsetting the balance of either the first or second balanced bodies.

Yet another object of the present invention is to provide a device for steadying co-axially located balanced bodies to permit removal or repair of another element connected to one of the balanced bodies remotely from the application of a steadying tool.

Another object of the present invention is to provide a tool for manipulating multiple balanced bodies which finds particular application in the automotive and aviation industries.

The invention possesses other objects and advantages especially as concerns particular characteristics and features thereof which will become apparent as the specification continues.

BRIEF DESCRIPTION OF THE DRAWINGS

FIG. 3 is a sectional view of the device of the present invention employed with the elements depicted in FIG. 2 and an additional socket.

FIG. 4 is an exploded view depicting the arrangement of the device of the present invention shown in FIG. 3.

FIG. 5 is a sectional view taken along line 5—5 of FIG. 3.

FIG. 6 is an alternate embodiment of the crank shaft bolt shown in FIG. 5.

Figure 1:
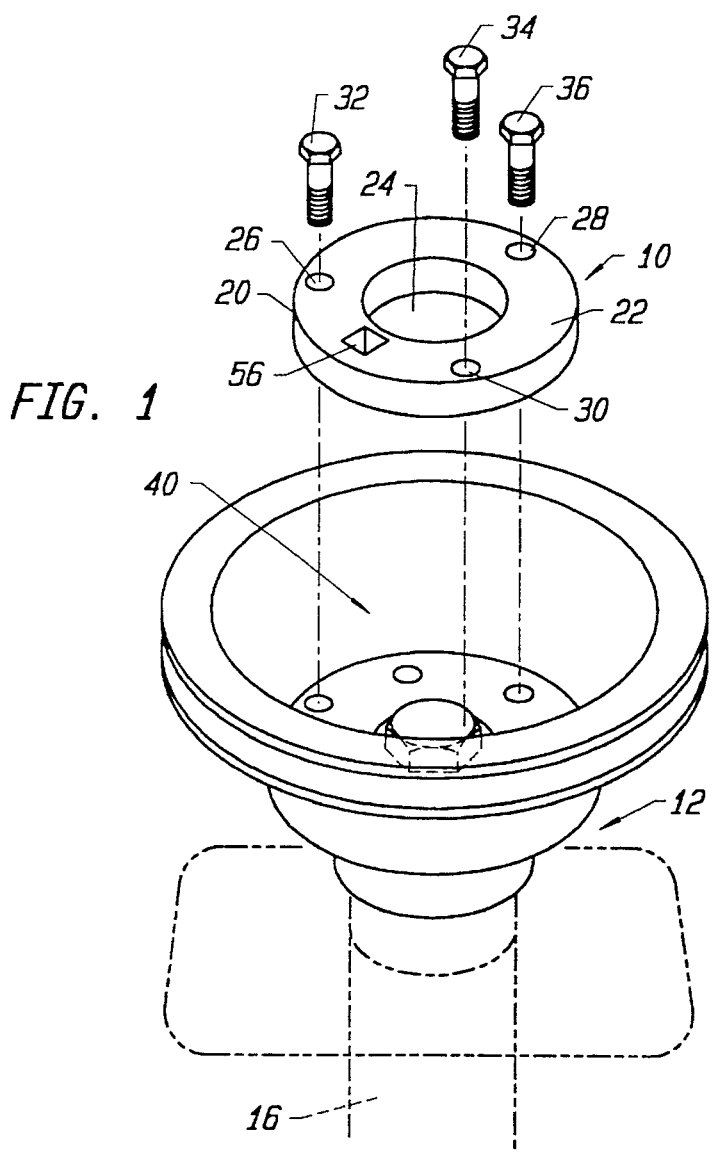
FIG. 1 is a perspective exploded view of the device of the present invention in conjunction with a crank shaft, harmonic balancer, and pulley.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be taken in conjunction with the prior described drawings.

The invention as a whole is depicted in the drawings by reference character 10. The device 10 is used for steadying a first balanced rotatable member, such as harmonic balancer 12, relative to a second balanced rotatable member 14, such as crank shaft 16 fitted with end bolt 18. Although torque converter 12 is depicted in the drawings, tool 10 may be employed to steady a torque converter, gears, such as pinions, plates, wheels, quadrants, and the like. End bolt 18 may also take the form of a threaded rod and nut, which threadingly engage one another. Although the first and second balanced members 12 and 14 are depicted in this manner, it may be apparent that other pairs of balanced members may be employed with the device of the present invention.

Figure 2:
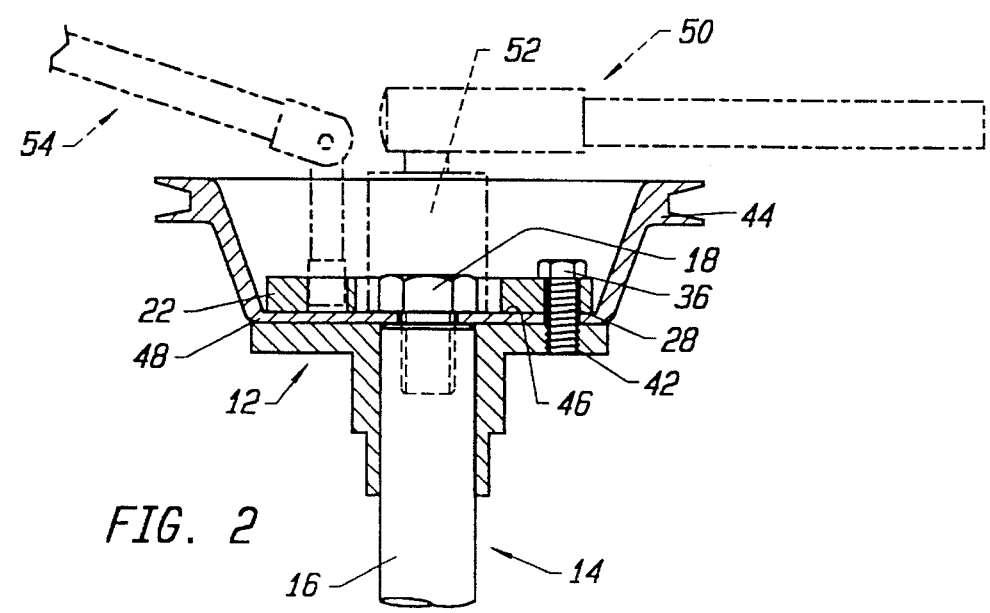
FIG. 2 is a sectional view of the device of the present invention assembled in conjunction with a crank shaft, harmonic balancer, and pulley, with torquing and steadying tools depicted in phantom.

With further reference to FIGS. 1 and 2, device 10 includes as one its portions in element 20 which is shown in the configuration of circular disk 22 having a central opening 24, which may be stepped. Peripheral round openings 26, 28 and 30 permit the passage of machine screws or other fasteners 32, 34, and 36. Of course, openings 26, 28, and 30 may be elongated, oversized, and the like. Each machine screw 32, 34, and 36 threadingly engages any one of the multiplicity of threaded openings 40 of harmonic balancer 12. With reference to FIG. 2, it may be observed that machine screw 36 is depicted as fitting in threaded opening 42 of harmonic balancer 12. In this regard, pulley 44, FIG. 2, interposes annular disc 22 and the harmonic balancer 12. Thus, lower surface 46 of element 20 lies adjacent upper surface 48 of harmonic balancer 12. In certain cases, pulley 44 would not be present which would allow lower surface 46 of annular disc 22 to directly contact upper surface 48 of harmonic balancer 12. Torquing tool 50 is depicted as being capable of turning end bolt 18 of crank shaft 16 through socket 52. Steadying tool 54 is depicted as engaging square opening 56 on annular ring 22 to prevent the turning of ring 22, harmonic balancer 12, crank shaft 14, and pulley 44. Central opening 24 through annular ring 22 permits access of socket 52 around the head of end bolt 18.

Turning now to FIGS. 3 and 4, it may be observed that an alternate embodiment of device 10A of the present invention is shown. Components shown in FIGS. 1 and 2 which are identical in FIGS. 3 and 4 have been similarly numbered. Socket 58 lies atop end bolt 60 which threads into crank shaft 16. Machine screw 62 extends from annular ring 22 through pulley 44 and into opening 42 of harmonic balancer 12. Torquing tool 50 includes an extended shaft 64 which engages socket 58. Opening 24 through the central portion of annular ring 22 permits shaft 64 to engage socket 58. Machine screws 66, 68, and 44 sandwich socket 58 between annular ring 22 and harmonic balancer 12. FIGS. 5 and 6 indicate alternate configurations for end bolt 60 in which the head portion 70 of end bolt 60 includes a quartet of protrusions spaced 90 degrees around head portion 70. Of course, socket 58 would include the necessary slots to engage such protrusions 72, FIG. 5. FIG. 6 indicates that head portion 74 of an end bolt 76 may also be employed to thread to the end of crank shaft 16. Head portion 74 includes a quartet of slots 78 which extend through the head portion 74 of end bolt 76. Again, socket 58 would Abe provided with the necessary ridges to engage plurality of slots 78 in order to turn on bolt 76.

In operation, the user of the devices 10 or 10A of the present invention bolts annular disc 22 to a position adjacent harmonic balancer 12 as depicted in FIGS. 2 and 3. With respect to embodiment 10, pulley 44 interposes annular disc 22 and harmonic balancer 12 between surfaces 46 and 48 thereof, respectively. FIG. 3 indicates that socket 58 may interpose annular ring 22 and pulley 44. In either case, machine screws are employed to position annular ring in a fixed relationship relative to harmonic balancer 12. Steadying tool 54 is then used to engage square opening 56 in annular ring 22 to prevent rotation of the harmonic balancer and connected elements. Torquing tool 64 is then employed to torque center bolt 18 or 60 as the case may be, FIGS. 2 or 3. In certain cases, steadying tool may be employed to hold harmonic balancer 12 while work is performed at the end of crank shaft 16 opposite to the connection of end bolt 18 and 60. For example, a fly wheel may be removed or replaced from crank shaft 16. In such a case, steadying tool 54 is held by one person while another person works on the fly wheel, or steadying tool 54 is wedged into place while a single person manipulates a fly wheel.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for steadying a first balanced rotatable member relative to a second balanced rotatable member with a steadying tool during precision torquing of the second balanced rotatable member with a torquing tool, comprising:

a. an element having a surface capable of lying adjacent to the first balanced rotatable member, said element including a faceted aperture capable of locking interaction with the steadying tool, and an access aperture to permit torquing of the second balanced rotatable member with the torquing tool, said element being configured for balance compatibility with the first and second balanced members;

b. means for fixing said element to the first balanced rotatable member; and c. a socket for engaging to the second balanced member, said socket for interposing said element and the second balanced body, said access aperture permitting engagements of said socket and the torquing tool.

2. The device of claim 1 in which said faceted aperture includes four walls.

3. The device of claim 1 in which said faceted aperture includes six walls.

4. The device of claim 1 in which said element is disc-shaped and includes an endless outer edge portion.

5. An apparatus comprising:

a. a first balanced rotatable member;

b. a second balanced rotatable member;

c. a steadying tool and a torquing tool;

d. an element having a surface capable of lying adjacent to the first balanced rotatable member, said element including a faceted aperture capable of locking interaction with the steadying tool, and an access aperture to permit torquing of the second balanced rotatable member with the torquing tool, said element being configured for balance compatibility with the first and second balanced members;

e. means for fixing said element to the first balanced rotatable member; and f. said second balanced rotatable body includes a pulley.

* * * * *